United States Patent
Zhao

(10) Patent No.: US 11,974,308 B2
(45) Date of Patent: Apr. 30, 2024

(54) METHOD AND DEVICE FOR TRANSMITTING UPLINK MESSAGE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 642 days.

(21) Appl. No.: 17/265,046

(22) PCT Filed: Aug. 6, 2018

(86) PCT No.: PCT/CN2018/099036
§ 371 (c)(1),
(2) Date: Feb. 1, 2021

(87) PCT Pub. No.: WO2020/029035
PCT Pub. Date: Feb. 13, 2020

(65) Prior Publication Data
US 2021/0266911 A1    Aug. 26, 2021

(51) Int. Cl.
*H04W 72/53* (2023.01)
*H04L 1/1812* (2023.01)
(Continued)

(52) U.S. Cl.
CPC ........... *H04W 72/53* (2023.01); *H04L 1/1819* (2013.01); *H04L 1/1896* (2013.01);
(Continued)

(58) Field of Classification Search
CPC . H04W 72/53; H04W 72/0446; H04W 72/21; H04W 72/56; H04W 72/1268;
(Continued)

(56) References Cited

U.S. PATENT DOCUMENTS

2010/0271970 A1* 10/2010 Pan .................. H04L 1/0029
370/252
2016/0344534 A1 11/2016 Uchino et al.
(Continued)

FOREIGN PATENT DOCUMENTS

| CN | 108207032 A | 6/2018 |
| WO | WO 2017/132810 A1 | 8/2017 |
| WO | WO 2019/160846 A1 | 8/2019 |

OTHER PUBLICATIONS

ETRI Remaining issues for PUCCH structure in long duration R1-1806667 May 21-25, 2018 (Year: 2018).*
(Continued)

*Primary Examiner* — Hardikkumar D Patel
(74) *Attorney, Agent, or Firm* — Oblon, McClelland, Maier & Neustadt, L.L.P.

(57) ABSTRACT

The present disclosure relates to a method and an apparatus for transmitting an uplink message. When a first PUCCH message and a second PUCCH message are to be simultaneously transmitted over at least one first time unit, one of the PUCCH message and the second PUCCH message is transmitted and the other one is dropped. The first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of first time units.

13 Claims, 9 Drawing Sheets determining whether a first PUCCH message and a second PUCCH message are to be simultaneously transmitted over at least one first time unit — 101 transmitting one of the first PUCCH message and the second PUCCH message, and dropping the other one — 102

(51) Int. Cl.
  *H04L 1/1867* (2023.01)
  *H04W 72/0446* (2023.01)
  *H04W 72/21* (2023.01)
  *H04W 72/56* (2023.01)
(52) U.S. Cl.
  CPC ....... *H04W 72/0446* (2013.01); *H04W 72/21* (2023.01); *H04W 72/56* (2023.01)
(58) Field of Classification Search
  CPC .. H04W 72/569; H04L 1/1819; H04L 1/1896; H04L 5/0053
  See application file for complete search history.

(56) References Cited

U.S. PATENT DOCUMENTS

2018/0176937 A1 6/2018 Chen et al.
2020/0404692 A1 12/2020 Yin et al.

OTHER PUBLICATIONS

Lenovo et al: Remaining issues on UCI multiplexing on PUCCH R1-1806336 XP051441541 (Year: 2018).*
International Search Report dated Apr. 12, 2019 in PCT/CN2016/099036 filed on Aug. 6, 2016, 2 pages.
Office Action dated Jan. 25, 2022, in corresponding Indian Patent Application No. 202147009159 (with English Translation), 7 pages.
Office Action dated Mar. 22, 2022, in corresponding Japanese Patent Application No. 2021-505839 (with English Translation), 15 pages.
Ericsson, "Summary of Partially Overlapped PUCCH Resources" [online], 3GPP TSG RAN WG1, Meeting #92bis, R-1805560, Jan. 18, 2018, 04, pp. 1-10 [Search date: Mar. 13, 2022], Internet <URL: https://www.3gpp.org/ftp/TSG_RAN/WG1_RL1/TSGR1_92b/Docs/R1 - 1805560.zip>.
ETRI, "Remaining issues for PUCCH structure in long-duration" [online], 3GPP TSG RAN, WG1 Meeting 93, R1-1806667, Jan. 12, 2018, 05, pp. 1-5, [Search date: Mar. 13, 2022], Internet <URL: https://www3gpp.org/ftp/TSG_RAN/WG1_RL1/TSGR1_93/Docs/R1_/1806667.zip>.
Extended European Search Report dated Jul. 26, 2021 in European Patent Application No. 18929289.9, 13 pages.
Combined Russian Office Action and Search Report dated Sep. 29, 2021 in Russian Patent Application No. 2021105611 (with English translation), 12 pages.
"Remaining issued on UCI multiplexing on PUCCH", Lenovo, Motorola Mobility, 3GPP TSG RAN WG1 Meeting #93, R1-1806336, Busan, Korea, May 21-25, 2018, XP051441541. 5 pages.
"Handling of PUCCH transmission with partial overlap", Huawei, HiSilicon, 3GPP TSG RAN WG1 Meeting #92, R1-1802690, Athens, Greece, Feb. 26-Mar. 2, 2018, XP051398123, 9 pages
"Remaining issues on PUCCH structure in long-duration", Huawei. HiSilicon, 3GPP TSG RAN WG1 Meeting #93. R1-1805885, Busan, Korea. May 21-25, 2018.

* cited by examiner determining whether a first PUCCH message and a second PUCCH message are to be simultaneously transmitted over at least one first time unit — 101 comparing a priority of the first PUCCH message with a priority of the second PUCCH message — 1023 transmitting one of the first PUCCH message and the second PUCCH message with a higher priority and dropping the other one with a lower priority — 1024

FIG. 4 determining whether a first PUCCH message and a second PUCCH message are to be simultaneously transmitted over at least one first time unit — 101 in response to that the second time unit at which transmission of the first PUCCH message is started is earlier than the second time unit at which transmission of the second PUCCH message is started, transmitting the first PUCCH message and comparing a priority of the first PUCCH message with a priority of the second PUCCH message before starting to transmit the second PUCCH message — 1025 transmitting the first PUCCH message continuously and dropping the second PUCCH message in response to that the priority of the first PUCCH message is higher than the priority of the second PUCCH message; and dropping the first PUCCH message and transmitting the second PUCCH message from the second time unit at which the second PUCCH message starts to be transmitted, in response to that the priority of the first PUCCH message is lower than the priority of the second PUCCH message — 1026

FIG. 5

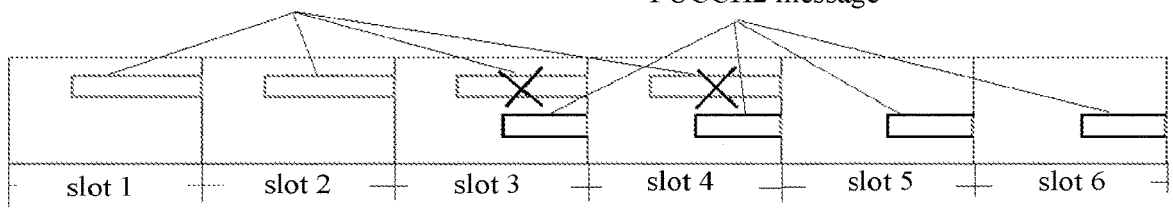

FIG. 6A

METHOD AND DEVICE FOR TRANSMITTING UPLINK MESSAGE

This application is the US national phase application of International Application No. PCT/CN2018/099036, filed on Aug. 6, 2018, the entire contents of which are incorporated herein by reference.

TECHNICAL FIELD

The disclosure relates to a field of communication technologies, including to a method and an apparatus for transmitting an uplink message, and a storage medium.

BACKGROUND

User equipment may be scheduled or configured to transmit multiple PUCCH (physical uplink control channel) messages overlapping in time domain over one time unit, such as one slot. In this case, there is a conflict that the multiple PUCCH messages need to be sent on a same OFDM (orthogonal frequency division multiplexing) symbol.

SUMMARY

According to a first aspect of the disclosure, there is provided a method for transmitting an uplink message. The method can include transmitting one of a first physical uplink control channel (PUCCH) message and a second PUCCH message and dropping the other one, in response to that the first PUCCH message and the second PUCCH message are to be simultaneously transmitted over at least one first time unit. The first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of first time units.

According to a second aspect of the disclosure, there is provided a method for transmitting an uplink message. The method can include multiplexing first uplink control information (UCI) in a first physical uplink control channel (PUCCH) message and second UCI in a second PUCCH message in response to that the first PUCCH message and the second PUCCH message are to be simultaneously transmitted over at least one first time unit, and transmitting multiplexed UCI by using one PUCCH message.

According to a third aspect of the disclosure, there is provided a device for transmitting an uplink message. The device can include a processor and a memory. The memory is configured to store instructions executable by the processor. The processor is configured to transmit one of a first physical uplink control channel (PUCCH) message and a second PUCCH message, and drop the other one in response to that the first PUCCH message and the second PUCCH message are to be simultaneously transmitted over at least one first time unit. The first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of the first time units.

According to a fourth aspect of the disclosure, there is provided a non-transitory computer readable storage medium. When instructions in the storage medium are executed by a processor, the processor is caused to implement the method according to the first aspect of the disclosure.

According to a fifth aspect of the disclosure, there is provided a device for transmitting an uplink message. The device can include a processor and a memory. The memory is configured to store instructions executable by the processor. The processor can be configured to multiplex first uplink control information (UCI) in a first physical uplink control channel (PUCCH) message and second UCI in a second PUCCH message in a response to that the first PUCCH message and the second PUCCH message are to be simultaneously transmitted over at least one first time unit; and transmit multiplexed UCI by using one PUCCH message.

According to a sixth aspect of the disclosure, there is provided a non-transitory computer readable storage medium. When instructions in the storage medium are executed by a processor, the processor is caused to implement the method according to the second aspect of the disclosure.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate exemplary embodiments consistent with the disclosure, and serve to explain the principle of the disclosure together with the specification.

FIG. 4 is a flow chart illustrating a method for transmitting an uplink message according to an exemplary embodiment.

FIG. 5 is a flow chart illustrating a method for transmitting an uplink message according to an exemplary embodiment.

FIG. 6A is a schematic diagram illustrating transmitting a PUCCH1 message repeatedly over multiple slots and transmitting a PUCCH2 message repeatedly over multiple slots according to an exemplary embodiment.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the disclosure. Instead, they are merely examples of apparatuses and methods consistent with aspects of the disclosure as detailed in the appended claims.

Figure 1:
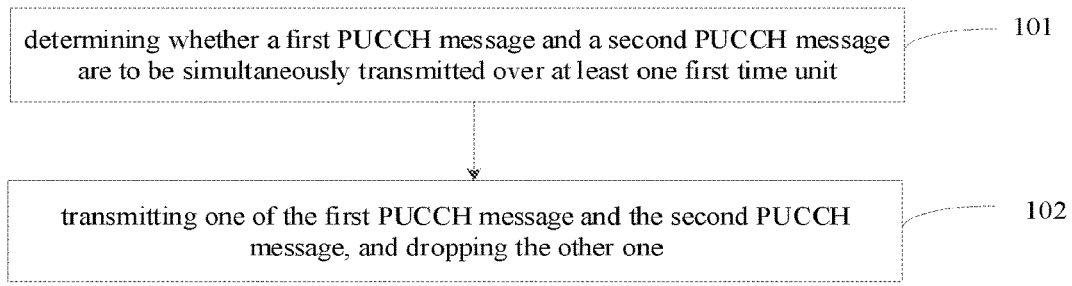
FIG. 1 is a flow chart illustrating a method for transmitting an uplink message according to an exemplary embodiment.

FIG. 1 is a flow chart illustrating a method for transmitting an uplink message according to an exemplary embodiment. The method may be applied to a terminal, that is, the method may be executed by the terminal. As illustrated in FIG. 1, the method includes the followings.

At block 101, it is determined whether a first PUCCH message and a second PUCCH message are to be simultaneously transmitted over at least one first time unit. In a possible implementation, the first time unit may be a symbol in an OFDM time domain or other time unit smaller than the symbol. In a further possible implementation, it may be determined whether the terminal needs to simultaneously transmit the first PUCCH message and the second PUCCH message over the at least one first time unit based on a configuration of the terminal by the base station or a scheduling of the terminal by the base station, such as a scheduling request sent by the base station to the terminal.

In the disclosure, transmitting the first PUCCH message and the second PUCCH message simultaneously over the at least one first time unit may be called that an overlap or conflict in the time domain exists or occurs between the first PUCCH message and the second PUCCH message.

At block 102, one of the first PUCCH message and the second PUCCH message is transmitted, and the other one is dropped. The first PUCCH message is a PUCCH message repeatedly transmitted over multiple second time units. The second PUCCH message is a PUCCH message transmitted over one second time unit or a PUCCH message transmitted over multiple second time units. The second time unit can include multiple first time units. The PUCCH message transmitted over one second time unit indicates a PUCCH message transmitted once over the second time unit, and the PUCCH message is not repeatedly transmitted over other second time units. The PUCCH message repeatedly transmitted over the multiple second time units indicates a PUCCH message transmitted once in sequence over each of the multiple second time units. For example, the PUCCH message may be transmitted once in sequence on each of three second time units when the PUCCH message needs to be repeatedly transmitted three times. In a possible implementation, the second time unit may be a slot in the OFDM time domain.

With the method for transmitting the uplink message according to this embodiment, when there is an overlap in the time domain between the first PUCCH message repeatedly transmitted over multiple second time units and the second PUCCH message transmitted over one second time unit or repeatedly transmitted over multiple second time units, one of the first PUCCH message and the second PUCCH message is selected for transmission, and the other one is dropped. In this way, a problem that the first PUCCH message and the second PUCCH message are overlapped in the time domain is avoided, and a requirement that the first PUCCH message and the second PUCCH message are transmitted repeatedly at the same time over the multiple second time units is met.

Figure 2:
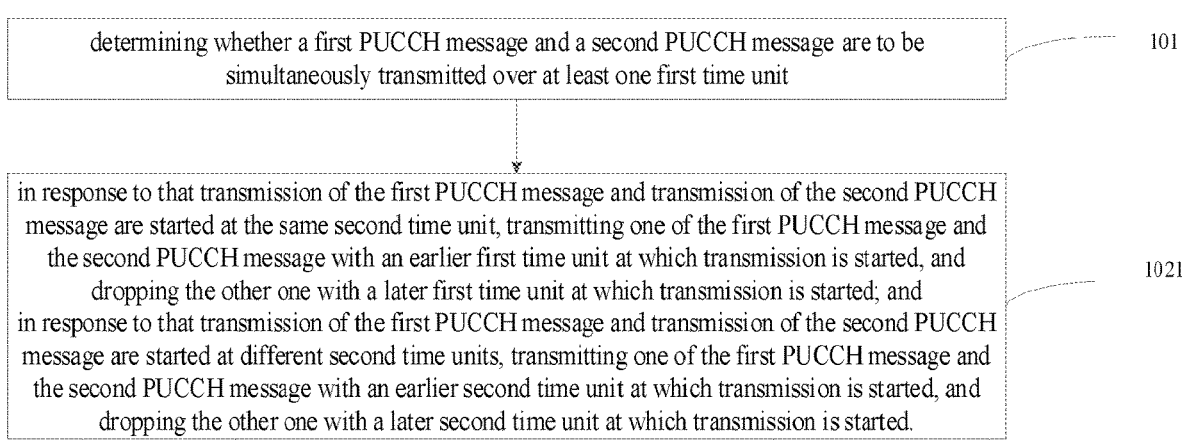
FIG. 2 is a flow chart illustrating a method for transmitting an uplink message according to an exemplary embodiment.
Figure 3A:
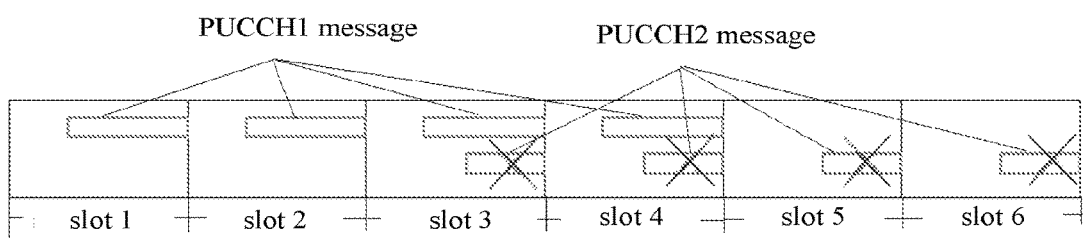
FIG. 3A is a schematic diagram illustrating transmitting a first PUCCH message repeatedly over multiple slots and transmitting a second PUCCH message repeatedly over multiple slots according to an exemplary embodiment.

FIG. 2 is a flow chart illustrating a method for transmitting an uplink message according to an exemplary embodiment. As illustrated in FIG. 2, in the method, transmitting one of the first PUCCH message and the second PUCCH message and dropping the other one includes the following. At block 1021, in response to that transmission of the first PUCCH message and transmission of the second PUCCH message are started at the same second time unit, that is, both the first PUCCH message and the second PUCCH message start to be transmitted at the same second time unit, one of the first PUCCH message and the second PUCCH message with an earlier first time unit at which transmission is started is transmitted, and the other one with a later first time unit at which transmission is started is dropped. In response to that transmission of the first PUCCH message and transmission of the second PUCCH message are started at different second time units, one of the first PUCCH message and the second PUCCH message with an earlier second time unit at which transmission is started is transmitted, and the other one with a later second time unit at which transmission is started is dropped. FIG. 3A is a schematic diagram illustrating transmitting a first PUCCH message repeatedly over multiple slots and transmitting a second PUCCH message repeatedly over multiple slots according to an exemplary embodiment.

Figure 3B:
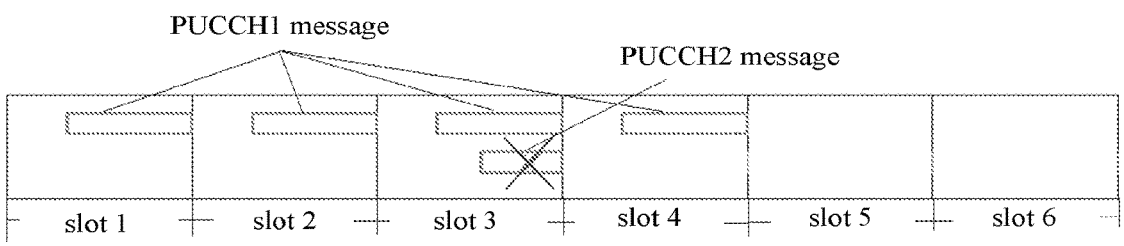
FIG. 3B is a schematic diagram illustrating transmitting a first PUCCH message repeatedly over multiple slots and transmitting a second PUCCH message over one slot according to an exemplary embodiment.

As illustrated in FIG. 3A, a PUCCH1 message (an example of the first PUCCH message) is repeatedly transmitted over a slot1, a slot2, a slot3, and a slot4, and a PUCCH2 message (an example of the second PUCCH message) is repeatedly transmitted over the slot3, the slot4, a slot5, and a slot6. A second time unit at which transmission of the PUCCH1 message is started is the slot1. A second time unit at which transmission of the PUCCH2 message is started is the slot3. The PUCCH1 message overlaps with the PUCCH2 message over the slot3 and the slot4 in the time domain. Since the slot1 at which transmission of the PUCCH1 message is started is earlier than the slot3 at which transmission of the PUCCH2 message is started, the PUCCH1 message is transmitted and the PUCCH2 message is dropped. FIG. 3B is a schematic diagram illustrating transmitting a first PUCCH message repeatedly over multiple slots and transmitting a second PUCCH message over one slot according to an exemplary embodiment. As illustrated in FIG. 3B, a PUCCH1 message is repeatedly transmitted over a slot1, a slot2, a slot3, and a slot4, and a PUCCH2 message is repeatedly transmitted over the slot3. Based on the same principle, the slot1 at which transmission of the PUCCH1 message is started is earlier than the slot3 at which transmission of the PUCCH2 message is started, so the PUCCH1 message is transmitted and the PUCCH2 message is dropped.

FIG. 4 is a flow chart illustrating a method for transmitting an uplink message according to an exemplary embodiment. As illustrated in FIG. 4, in this method, transmitting one of the first PUCCH message and the second PUCCH message and dropping the other one may include the followings. At block 1023, a priority of the first PUCCH message is compared with a priority of the second PUCCH message. At block 1024, one of the first PUCCH message and the second PUCCH message with a higher priority is transmitted, and the other one with a lower priority is dropped. The priority of the first PUCCH message may be compared with the priority of the second PUCCH message before the first PUCCH message and the second PUCCH message start to be transmitted, that is, before the time unit at which transmission of the first PUCCH message and transmission of the second PUCCH message are started. The priority of the first PUCCH message may be compared with the priority of the second PUCCH message when an overlap in the time domain occurs between the first PUCCH message and the second PUCCH. The priority of the first PUCCH message may be compared with the priority of the second PUCCH message based on a type of uplink control information (UCI) carried by the first PUCCH message and a type of UCI carried by the second PUCCH message. For example, a priority of a PUCCH message carrying HARQ (hybrid automatic repeat request)-ACK(acknowledgement) information is higher than that of a PUCCH message carrying CSI.

The priority of the first PUCCH message may also be compared with the second PUCCH message based on the number of repeated transmissions of the two messages. For example, the priority of a PUCCH message with the greater number of repeated transmissions is higher, and the priority of a PUCCH message with the smaller number of repeated transmissions is lower. The priority of the first PUCCH message may also be compared with the second PUCCH message based on configuration ways of time resources and frequency resources of the two messages. For example, the priority of a PUCCH message obtaining the time resource or the frequency resource by dynamic indication is higher than the priority of a PUCCH message obtaining the time resource or the frequency resource based on semi-static configuration. In addition, the priority of the first PUCCH message may also be compared with the priority of the second time unit based on a sequence of the second time unit at which transmission of the first PUCCH message is started and the second time unit at which transmission of the second PUCCH message is started. For example, the priority of a PUCCH message with an earlier second time unit at which transmission is started is higher than the priority of a PUCCH message with a later second time unit at which transmission is started.

FIG. 5 is a flow chart illustrating a method for transmitting an uplink message according to an exemplary embodiment. As illustrated in FIG. 5, in this method, transmitting one of the first PUCCH message and the second PUCCH message and dropping the other one may include followings. At block 1025, in response to that the second time unit at which transmission of the first PUCCH message is started is earlier than the second time unit at which transmission of the second PUCCH message is started, the priority of the first PUCCH message is compared with the priority of the second PUCCH message before starting to transmit the second PUCCH message. The second time unit at which transmission of the first PUCCH message is started is earlier than the second time unit at which transmission of the second PUCCH message is started refers to that the second time unit at which the first PUCCH starts to be transmitted is before the second time unit at which the second PUCCH message starts to be transmitted. The second time unit at which transmission of the first PUCCH message is started is later than the second time unit at which transmission of the second PUCCH message is started refers to that the second time unit at which the first PUCCH message starts to be transmitted is after the second time unit at which the second PUCCH message starts to be transmitted. At block 1026, the first PUCCH message is transmitted continuously and the second PUCCH message is dropped, in response to that the priority of the first PUCCH message is higher than the priority of the second PUCCH message.

At this time, since transmission of the second PUCCH message is not started, the second PUCCH message is directly dropped. The first PUCCH message is dropped and the second PUCCH message is transmitted from the second time unit at which the second PUCCH message starts to be transmitted, in response to that the priority of the first PUCCH message is lower than the priority of the second PUCCH message. Since the first PUCCH message has been transmitted before transmission of the second PUCCH message is started, the first PUCCH message is dropped from the second time unit at which transmission of the second PUCCH message is started. FIG. 6A is a schematic diagram illustrating transmitting a PUCCH1 message repeatedly over multiple slots and transmitting a PUCCH2 message repeatedly over multiple slots according to an exemplary embodiment. The priority of the PUCCH1 message is lower than the priority of the PUCCH2 message. A slot at which transmission of the PUCCH1 message is started is a slot1, and a slot at which transmission of the PUCCH2 message is started is a slot3. Therefore, the priority of the PUCCH1 message may be compared with the priority of the PUCCH2 message between the slot1 and the slot3. The PUCCH1 message is dropped the PUCCH2 message starts to be transmitted from the slot 3 in response to determining that the priority of the PUCCH1 message is lower than the priority of the PUCCH2 message.

Figure 6B:
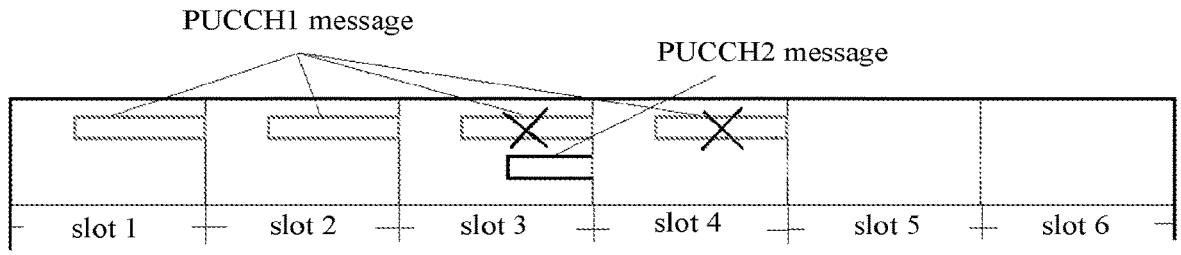
FIG. 6B is a schematic diagram illustrating transmitting a PUCCH1 message repeatedly over multiple slots and transmitting a PUCCH2 message over one slot according to an exemplary embodiment.

FIG. 6B is a schematic diagram illustrating transmitting a PUCCH1 message repeatedly over multiple slots and transmitting a PUCCH2 message over one slot according to an exemplary embodiment. As illustrated in FIG. 6B, the PUCCH1 message is dropped and the PUCCH2 message is transmitted at the slot3 at which transmission of the PUCCH2 message is started in response to determining between the slot1 and the slot3 that the priority of the PUCCH1 message is lower than the priority of the PUCCH2 message.

Figure 7:
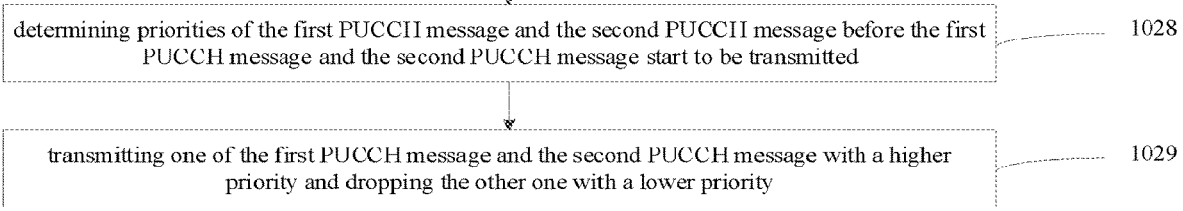
FIG. 7 is a flow chart illustrating a method for transmitting an uplink message according to an exemplary embodiment.
Figure 8A:
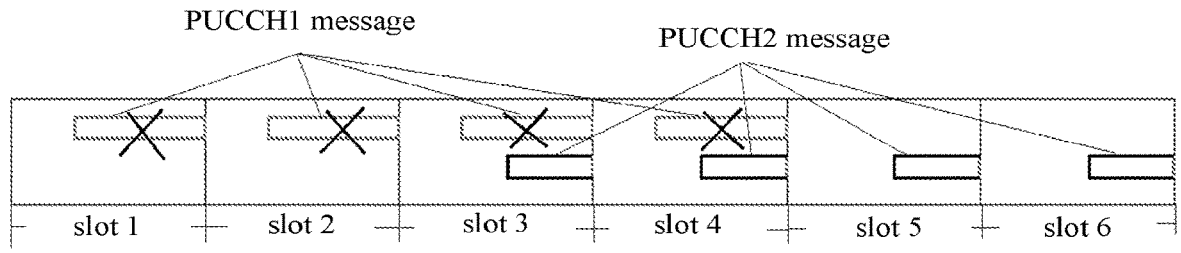
FIG. 8A is a schematic diagram illustrating transmitting a PUCCH1 message repeatedly over multiple slots and transmitting a PUCCH2 message repeatedly over multiple slots according to an exemplary embodiment.

FIG. 7 is a flow chart illustrating a method for transmitting an uplink message according to an exemplary embodiment. As illustrated in FIG. 7, in this method, transmitting one of the first PUCCH message and the second PUCCH message and dropping the other one may include the followings. At block 1028, priorities of the first PUCCH message and the second PUCCH message are determined before the first PUCCH message and the second PUCCH message start to be transmitted. At block 1029, one of the first PUCCH message and the second PUCCH message with a higher priority is transmitted, and the other one with a lower priority is dropped. FIG. 8A is a schematic diagram illustrating transmitting a PUCCH1 message repeatedly over multiple slots and transmitting a PUCCH2 message repeatedly over multiple slots according to an exemplary embodiment.

Figure 8B:
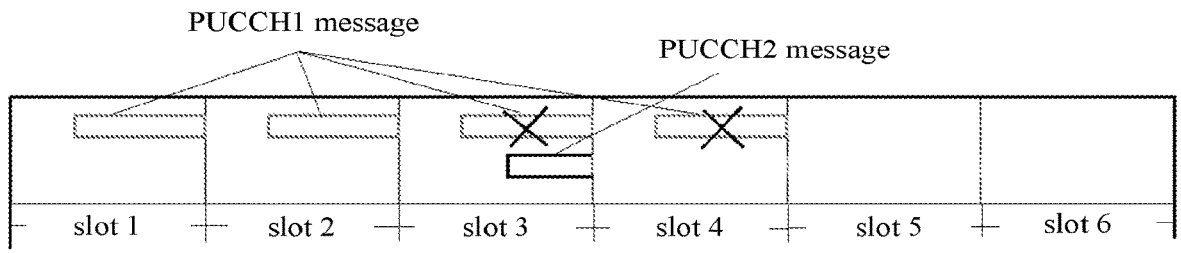
FIG. 8B is a schematic diagram illustrating transmitting a PUCCH1 message repeatedly over multiple slots and transmitting a PUCCH2 message over one slot according to an exemplary embodiment.

As illustrated in FIG. 8A, when it is determined that the priority of the PUCCH1 message is lower than the priority of the PUCCH2 message before the PUCCH1 message and the PUCCH2 message start to be transmitted, the PUCCH1 message is dropped over all the slots, i.e., a slot1, a slot2, a slot3, and a slot4, over which the PUCCH1 message needs to be repeatedly transmitted, and the PUCCH2 message starts to be transmitted at the slot 3 at which transmission of the PUCCH2 message is started. FIG. 8B is a schematic diagram illustrating transmitting a PUCCH1 message repeatedly over multiple slots and transmitting a PUCCH2 message over one slot according to an exemplary embodiment. As illustrated in FIG. 8B, when it is determined that the priority of the PUCCH1 message is lower than the priority of the PUCCH2 message before the PUCCH1 message and the PUCCH2 message start to be transmitted, then over the slot3 and the slot4 over which the PUCCH1 message overlaps with the PUCCH2 message in the time domain, the PUCCH1 message is dropped and the PUCCH2 message starts to be transmitted.

In a possible implementation, the priority of the first PUCCH message is compared with the priority of the second PUCCH message based on at least one of: a type of uplink control information (UCI) carried by the PUCCH message, the number of repeated transmissions for the PUCCH message, and a configuration way for a time resource or a frequency resource of the PUCCH message. The type of UCI includes a type of information carried by the UCI. The configuration way includes a semi-static configuration and a dynamic configuration. The terminal may compare the priority of the first PUCCH message with the priority of the second PUCCH message based on any one of the above items, and may also compare the priority of the first PUCCH message with the priority of the second PUCCH message according to any two or three of the above items. Different weights may be set for the above items, and the priority corresponding to the first PUCCH message and the priority corresponding to the second PUCCH message may be obtained by performing weighted summation on the items of each PUCCH message.

Figure 9:
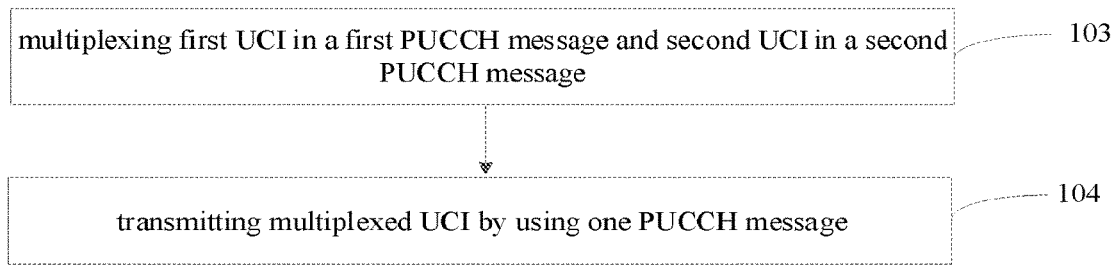
FIG. 9 is a flow chart illustrating a method for transmitting an uplink message according to an exemplary embodiment.

FIG. 9 is a flow chart illustrating a method for transmitting an uplink message according to an exemplary embodiment. The method is applied to a terminal, that is, the method may be executed by the terminal. As illustrated in FIG. 9, the method includes the followings.

At block 103, first UCI (uplink control information) in a first PUCCH message and second UCI in a second PUCCH message are multiplexed. In a possible implementation, the first UCI and the second UCI may be multiplexed in a way of channel coding, code division multiplexing or frequency division multiplexing.

At block 104, multiplexed UCI is transmitted by using one PUCCH message. In a possible implementation, the multiplexed UCI may be transmitted by using the first PUCCH message, the second PUCCH message, or other PUCCH message than the first PUCCH message and the second PUCCH message.

With the method for transmitting the uplink message according to this embodiment, the UCI of the first PUCCH message and the second PUCCH message are multiplexed, and then the multiplexed UCI is transmitted by using one PUCCH message when there is an overlap in time domain between the first PUCCH message repeatedly transmitted over multiple second time units and the second PUCCH message transmitted over one second time unit or repeatedly transmitted over multiple second time units. In this way, a problem that the first PUCCH message overlaps with the second PUCCH message in the time domain is avoided, and a requirement that the first PUCCH message and the second PUCCH message are repeatedly transmitted over the multiple second time units at the same time is met.

Figure 10:
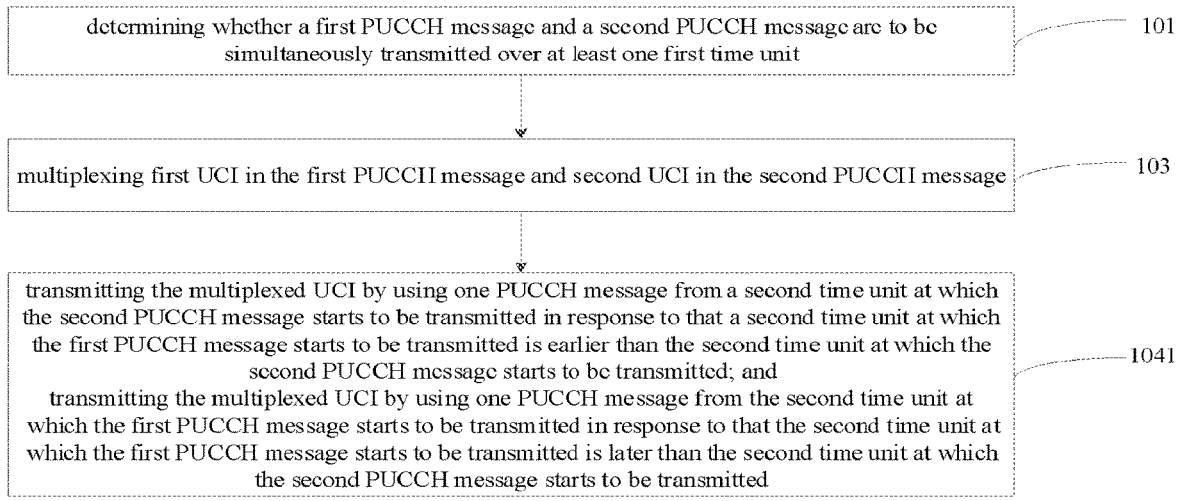
FIG. 10 is a flow chart illustrating a method for transmitting an uplink message according to an exemplary embodiment.

FIG. 10 is a flow chart illustrating a method for transmitting an uplink message according to an exemplary embodiment. As illustrated in FIG. 10, in the method, transmitting the multiplexed UCI by using one PUCCH message may include followings. At block 1041, the multiplexed UCI is transmitted by using one PUCCH message from the second time unit at which the second PUCCH message starts to be transmitted in response to that a second time unit at which the first PUCCH message starts to be transmitted is earlier than a second time unit at which the second PUCCH message starts to be transmitted; and the multiplexed UCI is transmitted by using one PUCCH message from the second time unit at which the first PUCCH message starts to be transmitted in response to that the second time unit at which the first PUCCH message starts to be transmitted is later than the second time unit at which the second PUCCH message starts to be transmitted. The multiplexed UCI may be obtained by multiplexing the first UCI and the second UCI. With the method of this embodiment, the UCIs carried by the first PUCCH message and the second PUCCH message may be multiplexed only over the later second time unit at which one of the first PUCCH message and the second first PUCCH message starts to be transmitted, thereby reducing the number of multiplexing UCIs, and solving an overlap problem between the first PUCCH message and the second PUCCH message in the time domain.

Figure 11:
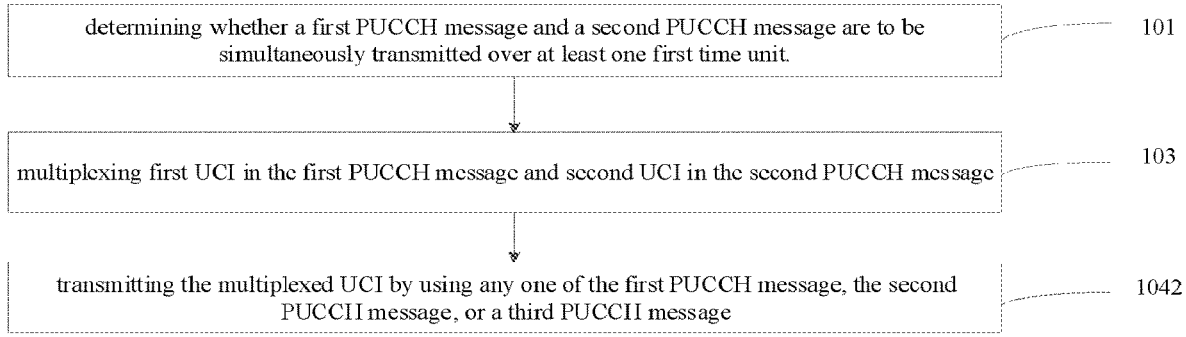
FIG. 11 is a flow chart illustrating a method for transmitting an uplink message according to an exemplary embodiment.

FIG. 11 is a flow chart illustrating a method for transmitting an uplink message according to an exemplary embodiment. As illustrated in FIG. 11, in the method, transmitting the multiplexed UCI by using one PUCCH message may include followings. At block 1042, the multiplexed UCI is transmitted by using any one of the first PUCCH message, the second PUCCH message, or a third PUCCH message. The third PUCCH message is a PUCCH message other than the first PUCCH message and the second PUCCH message, a PUCCH message transmitted over one second time unit, or a PUCCH message repeatedly transmitted over multiple second time units. A second time unit at which the third PUCCH message starts to be transmitted is same as a second time unit at which the first PUCCH message or the second PUCCH message starts to be transmitted. The number of second time units for repeatedly transmitting the third PUCCH message may be same as the number of repeated transmissions of the first PUCCH message or the number of second time units for repeatedly transmitting the second PUCCH message when the multiplexed UCI is transmitted by using the third PUCCH message. The larger one or the smaller one of the number of second time units for repeatedly transmitting the first PUCCH message and the number of second time units for repeatedly transmitting the second PUCCH message may be selected as the number of repeated transmissions for the third PUCCH message based on an actual transmission requirement.

Figure 12:
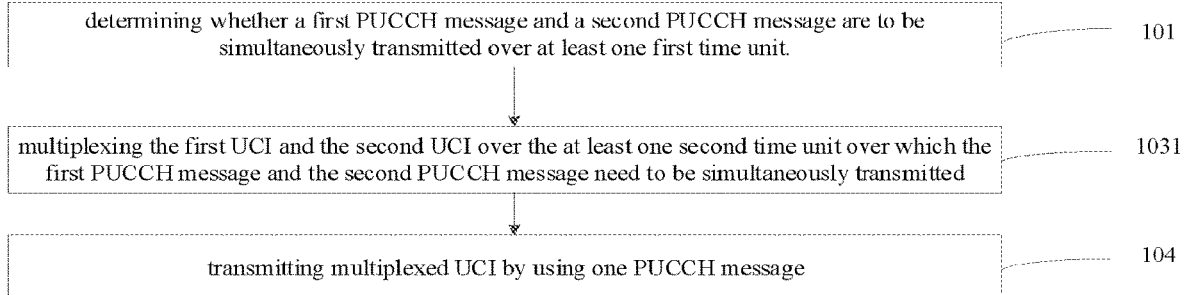
FIG. 12 is a flow chart illustrating a method for transmitting an uplink message according to an exemplary embodiment.
Figure 13A:
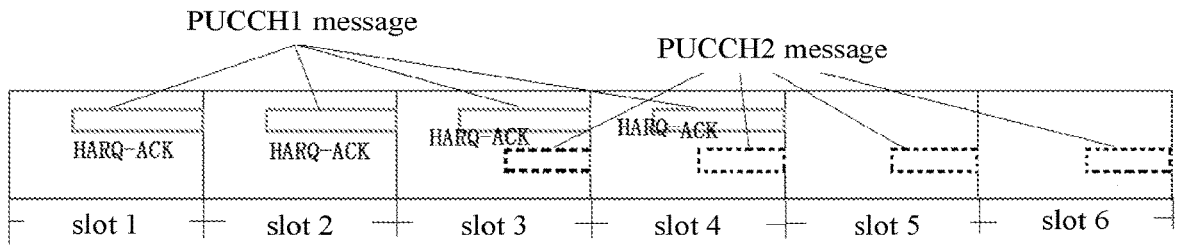
FIG. 13A is a schematic diagram illustrating transmitting a PUCCH1 message repeatedly over multiple slots and transmitting a PUCCH2 message repeatedly over multiple slots according to an exemplary embodiment.

FIG. 12 is a flow chart illustrating a method for transmitting an uplink message according to an exemplary embodiment. As illustrated in FIG. 12, in the method, multiplexing the first UCI in the first PUCCH message and the second UCI in the second PUCCH message may include followings. At block 1031, the first UCI and the second UCI are multiplexed over the at least one second time unit over which the first PUCCH message and the second PUCCH message are to be simultaneously transmitted. That is, the first UCI and the second UCI are multiplexed over the second time unit over which the first PUCCH message overlaps with the second PUCCH message in time domain. FIG. 13A is a schematic diagram illustrating transmitting a PUCCH1 message repeatedly over multiple slots and transmitting a second PUCCH message repeatedly over multiple slots according to an exemplary embodiment. A format of the PUCCH1 message and the PUCCH2 message is a PUCCH format1. The PUCCH1 is used to transmit HARQ-ACK information, and the PUCCH2 is used to transmit SR (scheduling request) information. Multiplexing the UCI in the PUCCH1 message and the UCI in the PUCCH2 message may refer to transmitting the HARQ-ACK information by using the PUCCH2 message when a value of the SR is positive, and transmitting the HARQ-ACK information by using the PUCCH1 message when the value of the SR is negative.

Figure 13B:
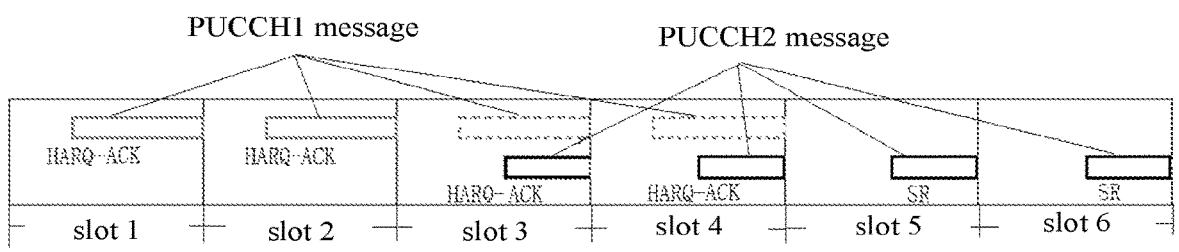
FIG. 13B is a schematic diagram illustrating transmitting a PUCCH1 message repeatedly over multiple slots and transmitting a PUCCH2 message repeatedly over multiple slots according to an exemplary embodiment.

As illustrated in FIG. 13A, the PUCCH1 message overlaps with the PUCCH2 message within the slot3 and slot4 in the time domain. The HARQ-ACK in the PUCCH1 message and the SR in the PUCCH2 message may be multiplexed over the slot3 and the slot4 when the value of the SR is negative, that is, the HARQ-ACK information is transmitted by using the PUCCH1 message over the slot3 and the slot4. FIG. 13B is a schematic diagram illustrating transmitting a PUCCH1 message repeatedly over multiple slots and transmitting a PUCCH2 message repeatedly over multiple slots according to an exemplary embodiment. As illustrated in FIG. 13B, the HARQ-ACK information is transmitted by using the PUCCH2 message over the slot3 and the slot4 illustrated in FIG. 13B when the value of the SR is positive. With the method of this embodiment, the UCI carried by the first PUCCH message and the UCI carried by the second PUCCH message may be multiplexed only over the second time unit over which the first PUCCH message overlaps with the second PUCCH message in the time domain, and the first PUCCH message and the second PUCCH message may be transmitted based on respective transmission requirements within the second time units over which the first PUCCH message does not overlap with the second PUCCH message in the time domain, thereby reducing the number of multiplexing operations for the UCI.

Figure 14:
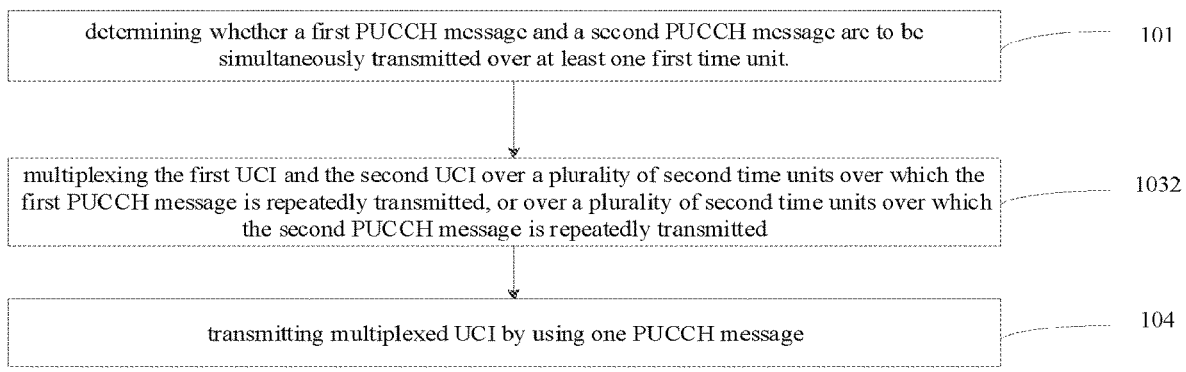
FIG. 14 is a flow chart illustrating a method for transmitting an uplink message according to an exemplary embodiment.

FIG. 14 is a flow chart illustrating a method for transmitting an uplink message according to an exemplary embodiment. As illustrated in FIG. 14, in the method, multiplexing the first UCI in the first PUCCH message and the second UCI in the second PUCCH message may include followings. At block 1032, the first UCI and the second UCI are multiplexed over multiple second time units over which the first PUCCH message is repeatedly transmitted, or over multiple second time units over which the second PUCCH message is repeatedly transmitted. A difference between the method illustrated in FIG. 14 and the method illustrated in FIG. 12 is as follows. In this method, not only the first UCI and the second UCI need to be multiplexed and transmitted over the second time unit over which the first PUCCH message overlaps with the second PUCCH message in time domain, but also the first UCI and the second UCI are also multiplexed and transmitted over other second time units over which the first PUCCH message is repeatedly transmitted, or the first UCI and the second UCI are also multiplexed and transmitted over other second time units over which the second PUCCH message is repeatedly transmitted.

Figure 15:
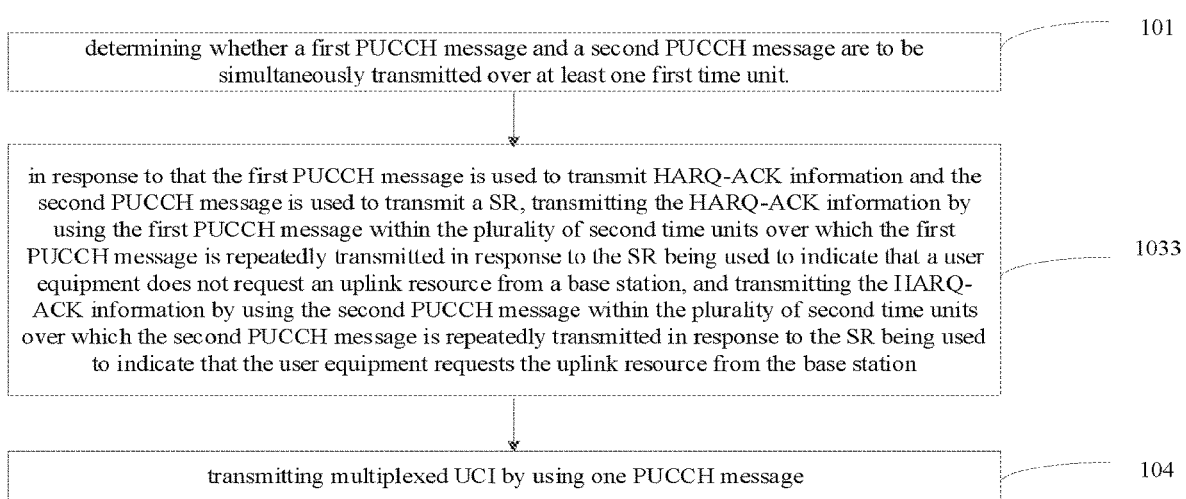
FIG. 15 is a flow chart illustrating a method for transmitting an uplink message according to an exemplary embodiment.
Figure 16A:
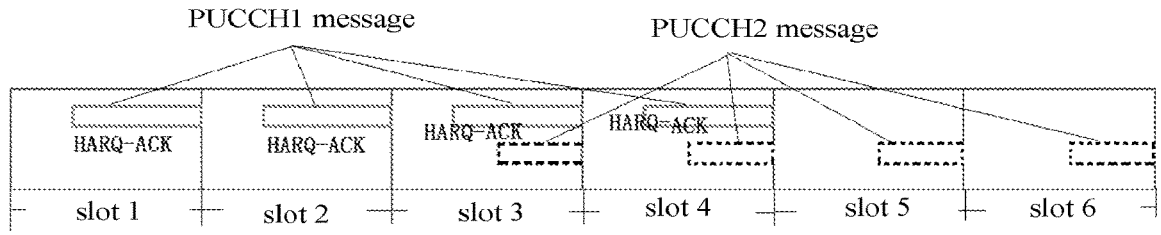
FIG. 16A is a schematic diagram illustrating transmitting a PUCCH1 message repeatedly over multiple slots and transmitting a PUCCH2 message repeatedly over multiple slots according to an exemplary embodiment.
Figure 16B:
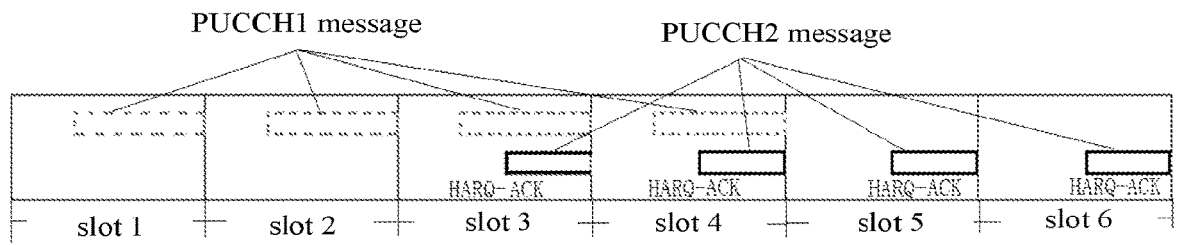
FIG. 16B is a schematic diagram illustrating transmitting a PUCCH1 message repeatedly over multiple slots and transmitting a PUCCH2 message repeatedly over multiple slots according to an exemplary embodiment.

FIG. 15 is a flow chart illustrating a method for transmitting an uplink message according to an exemplary embodiment. As illustrated in FIG. 15, in the method, multiplexing the first UCI and the second UCI over the multiple second time units over which the first PUCCH message is repeatedly transmitted, or over the multiple second time units over which the second PUCCH message is repeatedly transmitted may include followings. At block 1033, in response to that the first PUCCH message is used to transmit HARQ-ACK information and the second PUCCH message is used to transmit a scheduling request (SR), the HARQ-ACK information is transmitted by using the first PUCCH message within the multiple second time units over which the first PUCCH message is repeatedly transmitted in response to the SR being used to indicate that a user equipment does not request an uplink resource from a base station, for example, a value of the SR being negative, and the HARQ-ACK information is transmitted by using the second PUCCH message within the multiple second time units over which the second PUCCH message is repeatedly transmitted in response to the SR being used to indicate that the user equipment requests the uplink resource from the base station, for example, the value of the SR being positive. FIG. 16A is a schematic diagram illustrating transmitting a PUCCH1 message repeatedly over multiple slots and transmitting a PUCCH2 message repeatedly over multiple slots according to an exemplary embodiment. As illustrated in FIG. 16A, the HARQ-ACK message is transmitted over a slot1, a slot2, a slot3 and a slot4 over which the PUCCH1 message is repeatedly transmitted when the value of the SR is negative. FIG. 16B is a schematic diagram illustrating transmitting a PUCCH1 message repeatedly over multiple slots and transmitting a PUCCH2 message repeatedly over multiple slots according to an exemplary embodiment. As illustrated in FIG. 16B, the HARQ-ACK message is transmitted over the slot3, the slot4, a slot5 and a slot6 over which the PUCCH2 message is repeatedly transmitted when the value of the SR is positive.

In a possible implementation, the first PUCCH message and the second PUCCH message are PUCCH messages repeatedly transmitted on multiple slots. The PUCCH format of the first PUCCH message is format1 or format3, which is used to transmit ACK1, and the first PUCCH message is repeatedly transmitted over four slots. The PUCCH format of the second PUCCH message is format1 or format3, which is used to transmit ACK2 or CSI, and the second PUCCH message is repeatedly transmitted over four slots. The first UCI and the second UCI may be multiplexed and transmitted from the slot over which the overlap in the time domain occurs when the first PUCCH message overlaps with the second PUCCH message in the time domain. Transmission of the original PUCCH message may be maintained or dropped over slots before the slot over which the overlap in the time domain occurs.

Figure 17A:
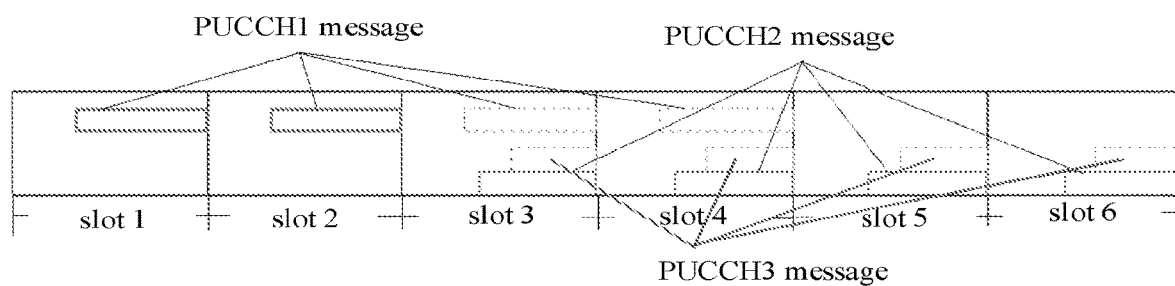
FIG. 17A is a schematic diagram illustrating transmitting a PUCCH1 message repeatedly over multiple slots and transmitting a PUCCH2 message repeatedly over multiple slots according to an exemplary embodiment.

As illustrated in FIG. 17, the slot at which transmission of the PUCCH1 message is started is slot1 illustrated in FIG. 17A, and the slot at which transmission of PUCCH2 message is started is slot3 illustrated in FIG. 17A. Transmission of the PUCCH1 message over the slot1 and the slot2 is maintained when the PUCCH1 message overlaps with the PUCCH2 message over the slot3 and slot4 in time domain illustrated in FIG. 17A, that is, the PUCCH1 message is still transmitted over the slot1 and the slot2. The PUCCH3 message obtained by multiplexing the first UCI and the second UCI is transmitted over the slot over which the PUCCH1 message overlaps the PUCCH2 message in time domain and other slots over which the PUCCH1 message is repeatedly transmitted.

Figure 17B:
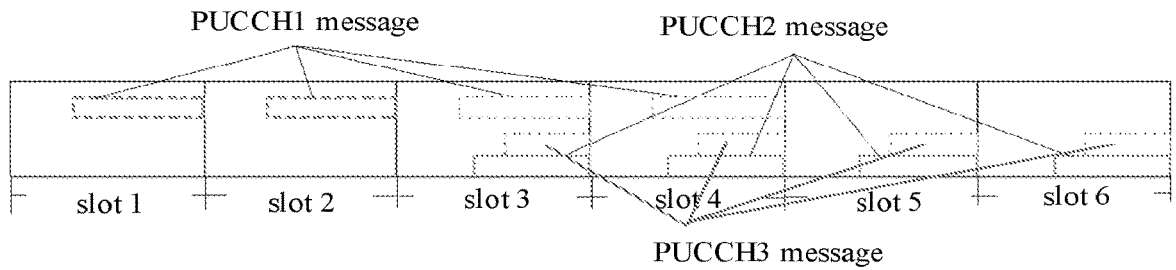
FIG. 17B is a schematic diagram illustrating transmitting a PUCCH1 message repeatedly over multiple slots and transmitting a PUCCH2 message repeatedly over multiple slots according to an exemplary embodiment.

As illustrated in FIG. 17B, a slot at which transmission of the PUCCH1 message is started is slot1, and a slot at which transmission of the PUCCH2 message is started is slot3. Transmission of the PUCCH1 message over the slot1 and the slot2 is dropped when an overlap between the PUCCH1 message and the PUCCH2 message occurs over the slot3 and the slot4 in the time domain, that is, transmission of the PUCCH1 message is dropped over the time unit at which transmission of the PUCCH1 message is started. The PUCCH3 message is transmitted over the slot3 and the slot4 over which the overlap between the PUCCH1 message and the PUCCH2 message occurs in the time domain, and other slots over which the PUCCH2 message is repeatedly transmitted, that is, slot5 and slot6.

Figure 18:
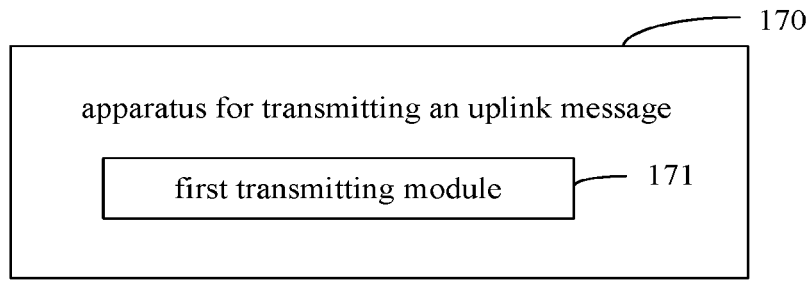
FIG. 18 is a block diagram illustrating an apparatus for transmitting an uplink message according to an exemplary embodiment.

FIG. 18 is a block diagram illustrating an apparatus for transmitting an uplink message according to an exemplary embodiment. As illustrated in FIG. 18, the apparatus 170 includes a first transmitting module 171. The first transmitting module 171 is configured to transmit one of a first physical uplink control channel (PUCCH) message and a second PUCCH message and drop the other one in response to that the first PUCCH message and the second PUCCH message need to be simultaneously transmitted over at least one first time unit. The first PUCCH message is a PUCCH message repeatedly transmitted over multiple second time units, the second PUCCH message is a PUCCH message transmitted over one second time unit or a PUCCH message transmitted at the multiple second time units, and the second time unit includes multiple first time units.

Figure 19:
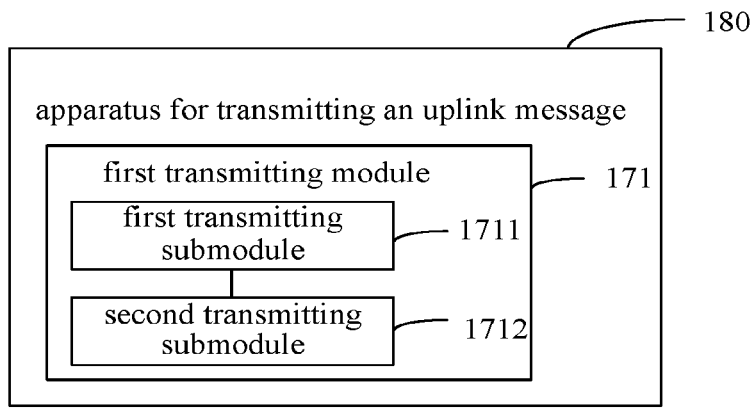
FIG. 19 is a block diagram illustrating an apparatus for transmitting an uplink message according to an exemplary embodiment.

FIG. 19 is a block diagram illustrating an apparatus for transmitting an uplink message according to an exemplary embodiment. As illustrated in FIG. 19, in the apparatus 180, the first transmitting module 171 may include: a first transmitting submodule 1711 and a second transmitting submodule 1712. The first transmitting submodule 1711 is configured to, in response to that transmission of the first PUCCH message and transmission of the second PUCCH message are started at the same second time unit, transmit one of the first PUCCH message and the second PUCCH message with an earlier first time unit at which transmission is started, and drop the other one with a later first time unit at which transmission is started. The second transmitting submodule 1712 is configured to, in response to that transmission of the first PUCCH message and transmission of the second PUCCH message are started at different second time units, transmit one of the first PUCCH message and the second PUCCH message with an earlier second time unit at which transmission is started, and drop the other one with a later second time unit at which transmission is started.

Figure 20:
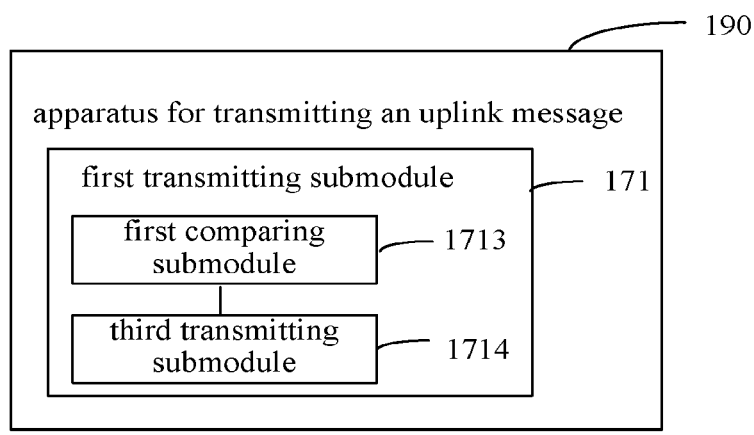
FIG. 20 is a block diagram illustrating an apparatus for transmitting an uplink message according to an exemplary embodiment.

FIG. 20 is a block diagram illustrating an apparatus for transmitting an uplink message according to an exemplary embodiment. As illustrated in FIG. 20, in the apparatus 190, the first transmitting module 171 may include: a first comparing submodule 1713 and a third transmitting submodule 1714. The first comparing submodule 1713 is configured to compare a priority of the first PUCCH message with a priority of the second PUCCH message. The third transmitting submodule 1714 is configured to transmit one of the first PUCCH message and the second PUCCH message with a higher priority and dropping the other one with a lower priority.

Figure 21:
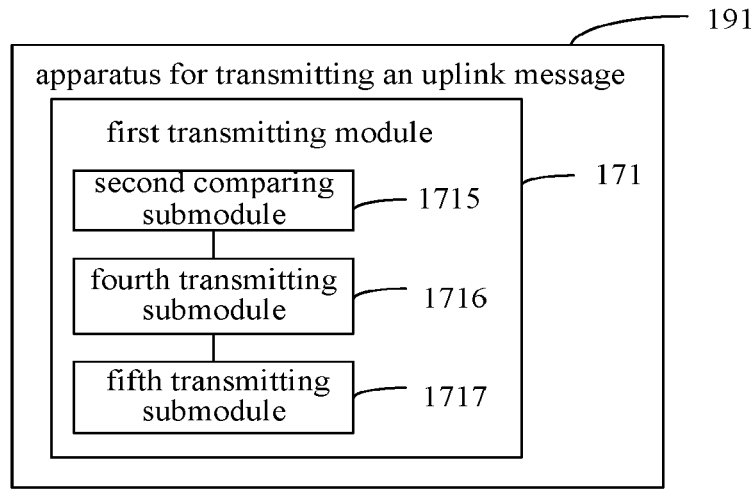
FIG. 21 is a block diagram illustrating an apparatus for transmitting an uplink message according to an exemplary embodiment.

FIG. 21 is a block diagram illustrating an apparatus for transmitting an uplink message according to an exemplary embodiment. As illustrated in FIG. 21, in the apparatus 191, the first transmitting module 171 may include: a second comparing submodule 1715, a fourth transmitting submodule 1716, and a fifth transmitting submodule 1717. The second comparing submodule 1715 is configured to, in response to that the second time unit at which transmission of the first PUCCH message is started is earlier than the second time unit at which transmission of the second PUCCH message is started, transmit the first PUCCH message and to compare a priority of the first PUCCH message with a priority of the second PUCCH message before starting to transmit the second PUCCH message. The fourth transmitting submodule 1716 is configured to transmit the first PUCCH message continuously and drop the second PUCCH message in response to that the priority of the first PUCCH message is higher than the priority of the second PUCCH message. The fifth transmitting submodule 1717 is configured to drop the first PUCCH message and to transmit the second PUCCH message from the second time unit at which the second PUCCH message starts to be transmitted, in response to that the priority of the first PUCCH message is lower than the priority of the second PUCCH message.

Figure 22:
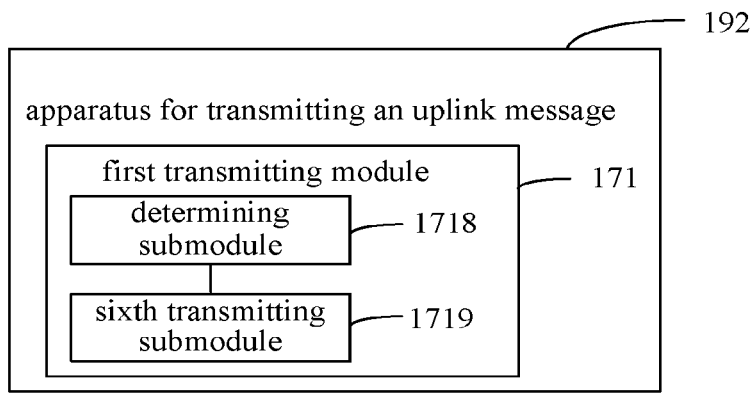
FIG. 22 is a block diagram illustrating an apparatus for transmitting an uplink message according to an exemplary embodiment.

FIG. 22 is a block diagram illustrating an apparatus for transmitting an uplink message according to an exemplary embodiment. As illustrated in FIG. 22, in the apparatus 192, the first transmitting module 171 may includes a determining submodule 1718 and a sixth transmitting submodule 1719. The determining submodule 1718 is configured to determine priorities of the first PUCCH message and the second PUCCH message before the first PUCCH message and the second PUCCH message start to be transmitted. The sixth transmitting submodule 1719 is configured to transmit one of the first PUCCH message and the second PUCCH message with a higher priority, and drop the other one with a lower priority.

In a possible implementation, the priority of the first PUCCH message is compared with the priority of the second PUCCH message based on at least one of: a type of uplink control information (UCI) carried by the PUCCH message, the number of repeated transmissions for the PUCCH message, and a configuration way for a time resource or a frequency resource of the PUCCH message. The type of UCI includes a type of information carried by the UCI, the configuration way includes a semi-static configuration and a dynamic configuration, and the PUCCH message includes the first PUCCH message and the second PUCCH message.

Figure 23:
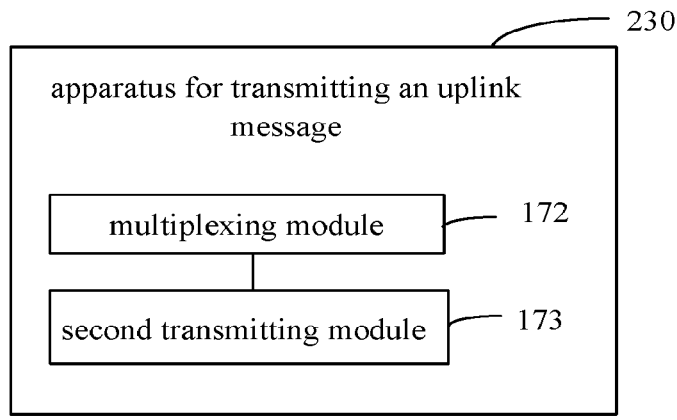
FIG. 23 is a block diagram illustrating an apparatus for transmitting an uplink message according to an exemplary embodiment.

FIG. 23 is a block diagram illustrating an apparatus for transmitting an uplink message according to an exemplary embodiment. As illustrated in FIG. 23, the apparatus 230 includes a multiplexing module 172 and a second transmitting module 173. The multiplexing module 172 is configured to multiplex first uplink control information (UCI) in a first physical uplink control channel (PUCCH) message and second UCI in a second PUCCH message in response to that the first PUCCH message and the second PUCCH message need to be simultaneously transmitted over at least one first time unit. The second transmitting module 173 is configured to transmit multiplexed UCI by using one PUCCH message.

Figure 24:
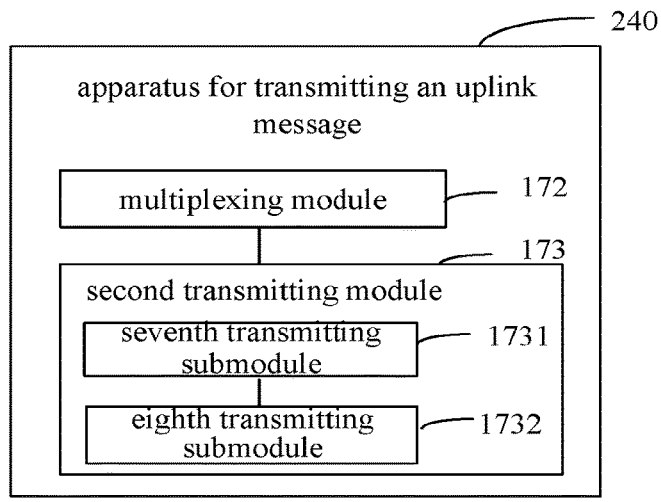
FIG. 24 is a block diagram illustrating an apparatus for transmitting an uplink message according to an exemplary embodiment.

FIG. 24 is a block diagram illustrating an apparatus for transmitting an uplink message according to an exemplary embodiment. As illustrated in FIG. 24, in the apparatus 240, the second transmitting module 173 may include a seventh transmitting submodule 1731 and an eighth transmitting submodule 1732. The seventh transmitting submodule 1731 is configured to transmit the multiplexed UCI by using one PUCCH message from the second time unit at which the second PUCCH message starts to be transmitted in response to that a second time unit at which the first PUCCH message starts to be transmitted is earlier than a second time unit at which the second PUCCH message starts to be transmitted. The eighth transmitting submodule 1732 is configured to transmit the multiplexed UCI by using one PUCCH message from the second time unit at which the first PUCCH message starts to be transmitted in response to that the second time unit at which the first PUCCH message starts to be transmitted is later than the second time unit at which the second PUCCH message starts to be transmitted.

In a possible implementation, the second transmitting module 173 may include a ninth transmitting submodule. The ninth transmitting submodule is configured to transmit the multiplexed UCI by using any one of the first PUCCH message, the second PUCCH message, or a third PUCCH message. The third PUCCH message is a PUCCH message other than the first PUCCH message and the second PUCCH message, a PUCCH message transmitted over one second time unit, or a PUCCH message repeatedly transmitted over a plurality of second time units, and a second time unit at which the third PUCCH message starts to be transmitted is same as a second time unit at which the first PUCCH message or the second PUCCH message starts to be transmitted.

In a possible implementation, the multiplexing module 172 may include a first multiplexing submodule. The first multiplexing submodule is configured to multiplex the first UCI and the second UCI over the at least one second time unit over which the first PUCCH message and the second PUCCH message are to be simultaneously transmitted.

In a further possible implementation, the multiplexing module 172 may include a second multiplexing submodule. The second multiplexing submodule is configured to multiplex the first UCI and the second UCI over multiple second time units over which the first PUCCH message is repeatedly transmitted, or over multiple second time units over which the second PUCCH message is repeatedly transmitted.

In a possible implementation, the multiplexing module 172 may include a third multiplexing submodule. The third multiplexing submodule is configured to, in response to that the first PUCCH message is used to transmit hybrid automatic repeat request-acknowledgement (HARQ-ACK) information and the second PUCCH message is used to transmit a scheduling request (SR), transmit the HARQ-ACK information by using the first PUCCH message within the multiple second time units over which the first PUCCH message is repeatedly transmitted in response to the SR being used to indicate that a user equipment does not request an uplink resource from a base station, and to transmit the HARQ-ACK information by using the second PUCCH message within the multiple second time units over which the second PUCCH message is repeatedly transmitted in response to the SR being used to indicate that the user equipment requests the uplink resource from the base station.

With respect to the apparatuses in the above exemplary embodiments, the detailed implementation in which each module performs operations has been described in detail in the embodiments of the method, which is not elaborated herein.

Figure 25:
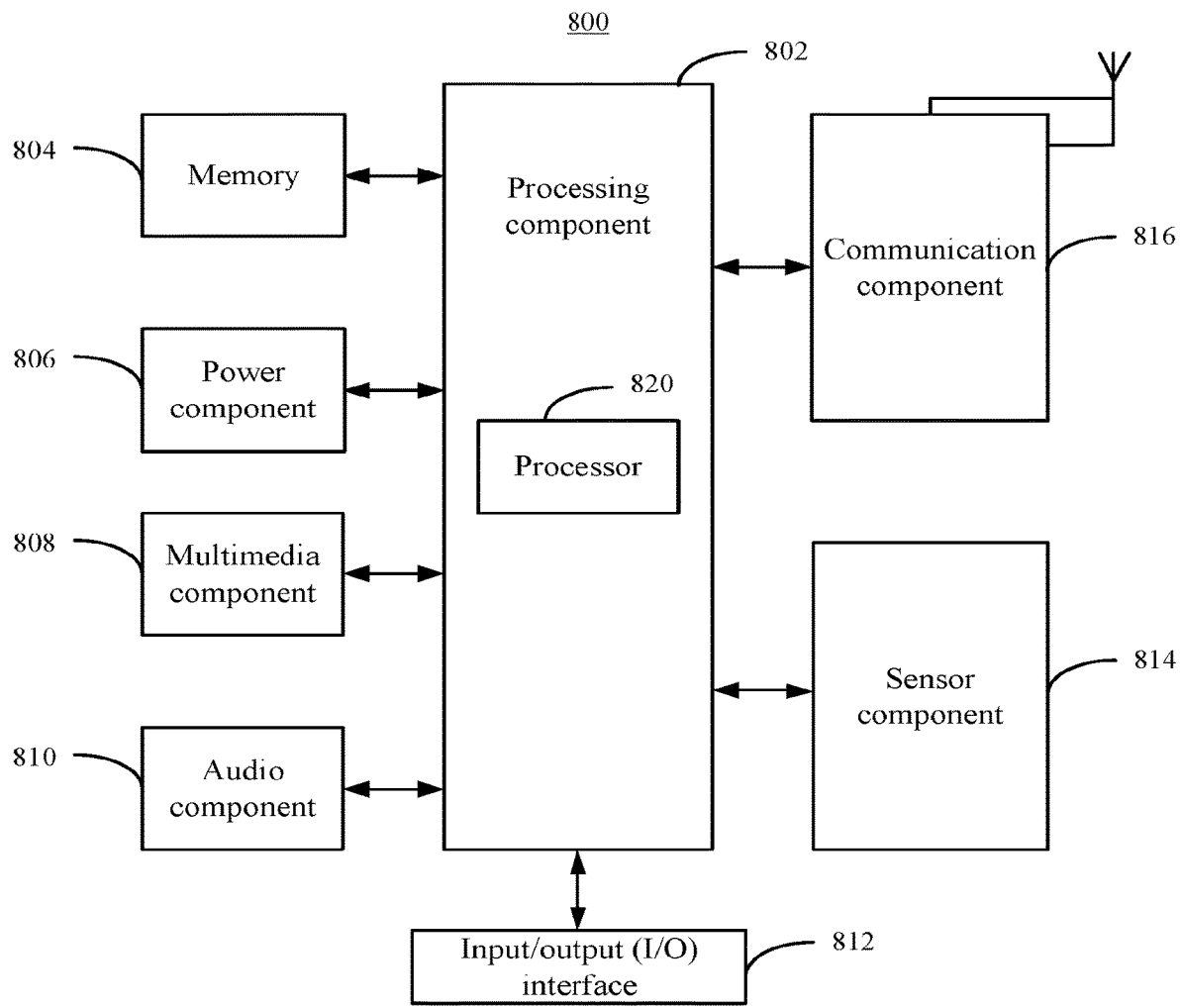
FIG. 25 is a block diagram illustrating a device for transmitting an uplink message according to an exemplary embodiment.

FIG. 25 is a block diagram illustrating a device for transmitting an uplink message according to an exemplary embodiment. For example, the device 800 may be a mobile phone, a computer, a digital broadcasting terminal, a message sending and receiving equipment, a game controller, a tablet device, a medical device, a fitness equipment, a personal digital assistant, or the like.

As illustrated in FIG. 25, the device 800 may include one or more of a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 802 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800 for performing the directional operation, contraction data, phonebook data, messages, pictures, video, and the like. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as an adjustment mode or a video mode. Each of the front camera and the rear camera may be a fixed optical lens system or have focus and optical zoom capability.

The audio component 810 is configured to output and/or input audio signals. For example, the audio component 810 includes a microphone ("MIC") for receiving an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 is configured to provide an interface between the processing component 802 and peripheral interface modules, such as a keyboard, a click wheel, buttons, and the like. The buttons may include, but be not limited to, a home button, a volume button, a starting button, and a locking button.

The sensor component 814 includes one or more sensors for providing status assessments of various aspects of the device 800. For example, the sensor component 814 may detect an open/closed status of the device 800, relative positioning of components, for example, the display and the keypad of the device 800, a change in position of the device 800 or a component of the device 800, a presence or absence of user contraction with the device 800, an orientation or an acceleration/deceleration of the device 800, and a change in temperature of the device 800. The sensor component 814 may include a proximity sensor for detecting the presence of nearby objects without any physical contact. The sensor component 814 may also include a light sensor, such as a CMOS (complementary metal-oxide-semiconductor)) or a CCD (charge coupled device) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on any communication standard, such as Wi-Fi, 2G, or 3G, or a combination thereof. In one exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiments, there is also provided a non-transitory computer readable storage medium including instructions, such as the memory 804 including the instructions. The instruction may be executed by the processor 820 in the device 800 for performing the above method. For example, the non-transitory computer readable storage medium may be a ROM, a RAM, a CD-ROM, a magnetic tape, a floppy disc, an optical data storage device, and the like.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for transmitting an uplink message, comprising:

transmitting one of a first physical uplink control channel (PUCCH) message and a second PUCCH message and dropping the other one of the first PUCCH message and the second PUCCH message when the first PUCCH message and the second PUCCH message are to be simultaneously transmitted over at least one first time unit, wherein the first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of first time units;

wherein transmitting one of the first PUCCH message and the second PUCCH message and dropping the other one of the first PUCCH message and the second PUCCH message comprises:

transmitting one of the first PUCCH message and the second PUCCH message with a higher priority and dropping the other one of the first PUCCH message and the second PUCCH message with a lower priority, wherein the first PUCCH message and the second PUCCH message have different priorities; and transmitting one of the first PUCCH message and the second PUCCH message and dropping the other one based on the second time unit at which transmission of the first PUCCH message is started and the second time unit at which transmission of the second PUCCH message is started, wherein the first PUCCH message and the second PUCCH message have the same priority.

2. The method of claim 1, wherein transmitting one of the first PUCCH message and the second PUCCH message and dropping the other one based on the second time unit at which transmission of the first PUCCH message is started and the second time unit at which transmission of the second PUCCH message is started comprises:

transmitting one of the first PUCCH message and the second PUCCH message with an earlier first time unit at which the transmission is started when transmission of the first PUCCH message and transmission of the second PUCCH message are started at the same second time unit, and dropping the other one of the first PUCCH message and the second PUCCH message with a later first time unit at which the transmission is started; and transmitting one of the first PUCCH message and the second PUCCH message with an earlier second time unit at which the transmission is started when transmission of the first PUCCH message and transmission of the second PUCCH message are started at different second time units, and dropping the other one of the first PUCCH message and the second PUCCH message with a later second time unit at which the transmission is started.

3. The method of claim 1, wherein transmitting one of the first PUCCH message and the second PUCCH message and dropping the other one of the first PUCCH message and the second PUCCH message further comprises:

comparing a priority of the first PUCCH message with a priority of the second PUCCH message.

4. The method of claim 3, wherein the priority of the first PUCCH message is compared with the priority of the second PUCCH message based on at least one of:

a type of uplink control information (UCI) carried by the PUCCH message, where the type of UCI includes a type of information carried by the UCI, the number of repeated transmissions for the PUCCH message, and a configuration manner for a time resource or a frequency resource of the PUCCH message, where the configuration manner includes a semi-static configuration and a dynamic configuration, and the PUCCH message includes the first PUCCH message and the second PUCCH message.

5. A method for transmitting an uplink message, comprising:

multiplexing first uplink control information (UCI) in a first physical uplink control channel (PUCCH) message and second UCI in a second PUCCH message when the first PUCCH message and the second PUCCH message are to be simultaneously transmitted over at least one first time unit, wherein the first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of first time units; and transmitting multiplexed UCI by using one PUCCH message;

wherein transmitting the multiplexed UCI by using one PUCCH message further comprises:

transmitting the multiplexed UCI by using any one of the first PUCCH message, the second PUCCH message, or a third PUCCH message, wherein the third PUCCH message is a PUCCH message other than the first PUCCH message and the second PUCCH message, a PUCCH message transmitted over one second time unit, or a PUCCH message repeatedly transmitted over a plurality of second time units, and a second time unit at which the third PUCCH message starts to be transmitted is the same as a second time unit at which the first PUCCH message or the second PUCCH message starts to be transmitted.

6. The method of claim 5, wherein multiplexing the first UCI in the first PUCCH message and the second UCI in the second PUCCH message further comprises:

multiplexing the first UCI and the second UCI over the at least one second time unit over which the first PUCCH message and the second PUCCH message are to be simultaneously transmitted.

7. The method of claim 5, wherein multiplexing the first UCI in the first PUCCH message and the second UCI in the second PUCCH message further comprises:

multiplexing the first UCI and the second UCI over a plurality of second time units over which the first PUCCH message is repeatedly transmitted, or over a plurality of second time units over which the second PUCCH message is repeatedly transmitted.

8. The method of claim 7, wherein multiplexing the first UCI and the second UCI over the plurality of second time units over which the first PUCCH message is repeatedly transmitted, or over the plurality of second time units over which the second PUCCH message is repeatedly transmitted further comprises:

transmitting hybrid automatic repeat request-acknowledgement (HARQ-ACK) information by using the first PUCCH message within the plurality of second time units over which the first PUCCH message is repeatedly transmitted in response to the SR being used to indicate that a user equipment does not request an uplink resource from a base station when the first PUCCH message is used to transmit HARQ-ACK information and the second PUCCH message is used to transmit a scheduling request (SR), and transmitting the HARQ-ACK information by using the second PUCCH message within the plurality of second time units over which the second PUCCH message is repeatedly transmitted in response to the SR being used to indicate that the user equipment requests the uplink resource from the base station.

9. A device for transmitting an uplink message, implementing the method of claim 1, comprising:
   a processor; and
   a memory that is configured to store instructions executable by the processor,
   wherein the processor is configured to:
   transmit one of a first physical uplink control channel (PUCCH) message and a second PUCCH message and drop the other one of the first PUCCH message and the second PUCCH message when the first PUCCH message and the second PUCCH message are to be simultaneously transmitted over at least one first time unit, wherein the first PUCCH message is a PUCCH message repeatedly transmitted over a plurality of second time units, the second PUCCH message is a PUCCH message transmitted over one second time unit or a PUCCH message transmitted over a plurality of second time units, and the second time unit includes a plurality of first time units;
   wherein the processor is further configured to:
   transmit one of the first PUCCH message and the second PUCCH message with a higher priority and drop the other one of the first PUCCH message and the second PUCCH message with a lower priority, wherein the first PUCCH message and the second PUCCH message have different priorities; and
   transmit one of the first PUCCH message and the second PUCCH message and dropping the other one based on the second time unit at which transmission of the first PUCCH message is started and the second time unit at which transmission of the second PUCCH message is started, wherein the first PUCCH message and the second PUCCH message have the same priority.

10. A device for transmitting an uplink message, comprising:
    a processor; and
    a memory that is configured to store instructions executable by the processor,
    wherein the processor is configured to:
    multiplex first uplink control information (UCI) in a first physical uplink control channel (PUCCH) message and second UCI in a second PUCCH message when the first PUCCH message and the second PUCCH message are to be simultaneously transmitted over at least one first time unit; and
    transmit multiplexed UCI by using one PUCCH message;
    wherein the processor is further configured to:
    transmit the multiplexed UCI by using any one of the first PUCCH message, the second PUCCH message, or a third PUCCH message, wherein the third PUCCH message is a PUCCH message other than the first PUCCH message and the second PUCCH message, a PUCCH message transmitted over one second time unit, or a PUCCH message repeatedly transmitted over a plurality of second time units, and a second time unit at which the third PUCCH message starts to be transmitted is same as a second time unit at which the first PUCCH message or the second PUCCH message starts to be transmitted.

11. The device of claim 10, wherein the processor is further configured to:
    multiplex the first UCI and the second UCI over the at least one second time unit over which the first PUCCH message and the second PUCCH message are to be simultaneously transmitted.

12. The device of claim 10, wherein the processor is further configured to:
    multiplex the first UCI and the second UCI over a plurality of second time units over which:
       the first PUCCH message is repeatedly transmitted, or
       over a plurality of second time units over which
       the second PUCCH message is repeatedly transmitted.

13. The device of claim 12, wherein the processor is further configured to:
    in response to that the first PUCCH message is used to transmit hybrid automatic repeat request-acknowledgement (HARQ-ACK) information and the second PUCCH message is used to transmit a scheduling request (SR), transmit the HARQ-ACK information by using the first PUCCH message within the plurality of second time units over which the first PUCCH message is repeatedly transmitted in response to the SR being used to indicate that a user equipment does not request an uplink resource from a base station when the first PUCCH message is used to transmit hybrid automatic repeat request-acknowledgement (HARQ-ACK) information and the second PUCCH message is used to transmit a scheduling request (SR), and transmit the HARQ-ACK information by using the second PUCCH message within the plurality of second time units over which the second PUCCH message is repeatedly transmitted in response to the SR being used to indicate that the user equipment requests the uplink resource from the base station.

* * * * *